(12) United States Patent
Kim (10) Patent No.: US 12,514,493 B2
(45) Date of Patent: Jan. 6, 2026

(54) SYSTEM FOR SKIN AND HAIR MEASUREMENT AND ANALYSIS

(71) Applicant: KC TECHNOLOGY CO., LTD., Gyeongju-si (KR)

(72) Inventor: Yong Shi Kim, Seoul (KR)

(73) Assignee: KC TECHNOLOGY CO., LTD., Gyeongju-si (KR)

(*) Notice: Subject to any disclaimer, the term of this patent is extended or adjusted under 35 U.S.C. 154(b) by 739 days.

(21) Appl. No.: 17/801,581

(22) PCT Filed: Dec. 11, 2020

(86) PCT No.: PCT/KR2020/018157
§ 371 (c)(1),
(2) Date: Aug. 23, 2022

(87) PCT Pub. No.: WO2022/092423
PCT Pub. Date: May 5, 2022

(65) Prior Publication Data
US 2023/0148269 A1 May 11, 2023

(30) Foreign Application Priority Data
Oct. 27, 2020 (KR) .......................... 10-2020-0140112

(51) Int. Cl.
*A61B 5/00* (2006.01)
*A61B 5/053* (2021.01)

(52) U.S. Cl.
CPC ............ *A61B 5/442* (2013.01); *A61B 5/0059* (2013.01); *A61B 5/053* (2013.01); *A61B 5/448* (2013.01)

(58) Field of Classification Search
CPC ....... A61B 5/442; A61B 5/0059; A61B 5/053; A61B 5/448; A61B 5/0022; A61B 5/441; A61B 5/0077; A61B 5/443; A61B 5/6898; A61B 8/08; G06T 7/60; G06Q 30/06
See application file for complete search history.

(56) References Cited

U.S. PATENT DOCUMENTS

| 6,081,612 | A  | * | 6/2000  | Gutkowicz-Krusin ..................... G06T 7/136 382/248 |
| 6,208,749 | B1 | * | 3/2001  | Gutkowicz-Krusin ..................... A61B 5/0077 382/128 |
| 6,993,167 | B1 | * | 1/2006  | Skladnev ............. A61B 5/0059 382/128 |
| 9,532,744 | B2 | * | 1/2017  | Mohamad Hani .... G01J 3/0208 |
| 10,282,914 | B1 | * | 5/2019  | Tran ..................... A61B 5/1036 |
| 11,172,873 | B2 | * | 11/2021 | Purwar .................. G06N 3/045 |

(Continued)

FOREIGN PATENT DOCUMENTS

| KR | 10-1348709 B1 | 1/2014 |
| KR | 10-1752830 A  | 7/2017 |

(Continued)

*Primary Examiner* — May A Abouelela
(74) *Attorney, Agent, or Firm* — Bridgeway IP Law Group, PLLC; Sang Ho Lee; Hyun Woo Shin (57) ABSTRACT

Provided herein is a system for measuring and analyzing skin and hair, which includes a skin and hair measurement and analysis device, a smart terminal of a user in which an application interlinked with the skin and hair measurement and analysis device is installed, and a server interlinked with the skin and hair measurement and analysis device and interlinked with the smart terminal.

14 Claims, 5 Drawing Sheets

(56) References Cited

U.S. PATENT DOCUMENTS

| | | | | |
|---|---|---|---|---|
| 11,730,372 B2* | 8/2023 | Westerhof | | A61B 5/441 600/306 |
| 11,742,089 B2* | 8/2023 | Jeong | | G16H 50/30 700/265 |
| 2003/0179929 A1* | 9/2003 | Zhang | | A61B 5/441 382/181 |
| 2004/0039379 A1* | 2/2004 | Viator | | A61B 18/203 606/9 |
| 2004/0145656 A1* | 7/2004 | Betra | | A61B 5/7445 705/16 |
| 2004/0201694 A1* | 10/2004 | Gartstein | | A61B 5/1072 348/207.99 |
| 2004/0215066 A1* | 10/2004 | Huang | | A61B 5/442 382/128 |
| 2005/0094147 A1* | 5/2005 | Yaroslavsky | | G01J 3/02 356/417 |
| 2005/0195316 A1* | 9/2005 | Kollias | | A61B 5/441 348/370 |
| 2006/0092315 A1* | 5/2006 | Payonk | | A61B 5/445 348/370 |
| 2007/0002479 A1* | 1/2007 | Menke | | A61B 5/442 359/490.02 |
| 2007/0035815 A1* | 2/2007 | Edgar | | H04N 1/628 359/359 |
| 2007/0040907 A1* | 2/2007 | Kern | | A61B 5/0059 348/E7.087 |
| 2007/0073156 A1* | 3/2007 | Zilberman | | A61B 5/444 600/473 |
| 2007/0252997 A1* | 11/2007 | Van Hal | | A61B 5/0059 356/448 |
| 2008/0075340 A1* | 3/2008 | Cotton | | G06T 7/0012 382/128 |
| 2008/0161661 A1* | 7/2008 | Gizewski | | A61B 5/0064 600/306 |
| 2008/0226151 A1* | 9/2008 | Zouridakis | | G06T 7/0012 600/300 |
| 2008/0294016 A1* | 11/2008 | Gobeyn | | A61B 5/411 600/301 |
| 2008/0294018 A1* | 11/2008 | Kurtz | | G16H 10/60 600/301 |
| 2009/0245603 A1* | 10/2009 | Koruga | | A61B 5/444 382/128 |
| 2010/0185064 A1* | 7/2010 | Bandic | | A61B 5/444 600/306 |
| 2011/0211047 A1* | 9/2011 | Chhibber | | G06T 7/0014 348/47 |
| 2012/0041282 A1* | 2/2012 | Nichol | | A61B 5/448 600/306 |
| 2012/0172685 A1* | 7/2012 | Gilbert | | A61B 5/0077 600/306 |
| 2014/0081095 A1* | 3/2014 | Krishnan | | A61B 5/0077 600/306 |
| 2014/0088440 A1* | 3/2014 | Swart | | G16H 80/00 600/476 |
| 2014/0316235 A1* | 10/2014 | Davis | | G16H 50/20 600/407 |
| 2015/0025343 A1* | 1/2015 | Gareau | | A61B 5/445 600/328 |
| 2016/0162728 A1* | 6/2016 | Arai | | G06V 10/443 382/118 |
| 2016/0275681 A1* | 9/2016 | D'Alessandro | | G06T 15/08 |
| 2017/0119130 A1* | 5/2017 | Witchell | | G01N 21/31 |
| 2017/0303844 A1* | 10/2017 | Baker | | G16H 30/40 |
| 2017/0367651 A1* | 12/2017 | Tzvieli | | A61B 5/0075 |
| 2018/0085003 A1* | 3/2018 | Goldring | | A61B 5/746 |
| 2018/0092574 A1* | 4/2018 | Tzvieli | | A61B 5/6803 |
| 2018/0094982 A1* | 4/2018 | Tzvieli | | A61B 5/6803 |
| 2019/0125249 A1* | 5/2019 | Rattner | | A61B 5/743 |
| 2019/0142274 A1* | 5/2019 | Addison | | A61B 5/68 600/300 |
| 2019/0239752 A1* | 8/2019 | Dumitrescu | | A61B 5/7264 |
| 2019/0246976 A1* | 8/2019 | Howell | | A61B 5/443 |
| 2020/0146622 A1* | 5/2020 | Bock | | G06V 40/161 |
| 2020/0167549 A1* | 5/2020 | Taoka | | A61B 5/6887 |
| 2020/0268260 A1* | 8/2020 | Tran | | A61B 1/00194 |
| 2020/0330027 A1* | 10/2020 | Varghese | | A61B 5/443 |
| 2020/0383631 A1* | 12/2020 | Canfield | | A61B 5/446 |
| 2020/0390337 A1* | 12/2020 | Frank | | A61B 5/0205 |
| 2021/0059533 A1* | 3/2021 | Patwardhan | | A61B 5/0082 |
| 2021/0128939 A1* | 5/2021 | Verghese | | A61N 5/0616 |
| 2021/0161390 A1* | 6/2021 | Kasprzak | | A61B 5/448 |
| 2021/0398273 A1* | 12/2021 | Kim | | A61B 5/448 |
| 2022/0277442 A1* | 9/2022 | Fernando | | A61B 5/0077 |
| 2023/0255547 A1* | 8/2023 | Shi | | A61B 5/0533 600/306 |
| 2024/0115202 A1* | 4/2024 | Tran | | A61B 5/002 |

FOREIGN PATENT DOCUMENTS

| | | |
|---|---|---|
| KR | 10-1756900 B1 | 7/2017 |
| KR | 10-2017-0088174 A | 8/2017 |
| KR | 10-2017-0097506 A | 8/2017 |
| KR | 10-2018-0050882 A | 5/2018 |
| KR | 10-2018-0064963 A | 6/2018 |
| KR | 10-2019-0046442 A | 5/2019 |

* cited by examiner

SYSTEM FOR SKIN AND HAIR MEASUREMENT AND ANALYSIS

TECHNICAL FIELD

The present invention relates to a system for measuring and analyzing skin and hair, and more particularly, to a system for measuring and analyzing skin and hair, which is capable of measuring a density and a thickness of hair of a user, and elasticity, moisture, wrinkles, pores, oiliness, roughness, a pigment, skin sensitivity, a skin tone, or sebum of skin of the user and obtaining a high quality image by further including an infrared filter for removing infrared rays in an infrared wavelength band, in which structures of a sensor, a light source, and a lower case are designed to allow general light and infrared rays emitted from the light source to be emitted to the skin or hair of the user well and allow light reflected and diffracted from the skin or hair of the user to be collected well, and which recommends cosmetics according to a characteristic of the skin of the user.

BACKGROUND ART

It is a well-known fact that the skin care market and the scalp care or hair care market have been rapidly growing in recent years. As interest in appearance increases, the skin, scalp, and hair measurement and care markets are growing together among people of all ages.

As the related patent document, Korean Patent Laid-Open Application No. 10-2018-0050882 (published on May 16, 2018) discloses a skin care device including a main body which forms the exterior to simultaneously or selectively perform care on a surface and a core of the skin, a tip head formed to protrude from the main body, a front cap which forms a front surface of the tip head, a first electrode part in which a plurality of pin-shaped electrodes are exposed in the form of an array on a front surface of the front cap, a second electrode part having a positive electrode and a negative electrode which are partitioned and provided on both sides of the first electrode part, and a controller configured to control to independently apply a high-frequency voltage to the first electrode part and the second electrode part.

In addition, Korean Patent Registration No. 10-1756900 (registered on Jul. 5, 2017) discloses a system for skin care which is capable of providing cold and hot air and includes a cold and hot air forming part configured to generate cold or heat and selectively convert supplied external air into cold air or hot air, a cold/hot air supply mask including a cold and hot air cable in which an inner space is formed and a plurality of cold and hot air supply holes are formed in a surface facing the face of a user and which is connected to the inner space to selectively supply cold air or hot air to the inner space, and an essence mask pack which is attached to the face of the user and is disposed to face the cold and hot air supply mask and in which a cold and hot air circulation hole that is larger than the cold and hot air supply hole is formed to circulate the cold air or the hot air, which is supplied through the cold and hot air supply hole, to the face of the user.

However, even in the above-described Patent Documents, a device or a system for measuring and analyzing skin and hair that is capable of measuring a density and a thickness of hair of a user, and elasticity, moisture, wrinkles, pores, oiliness, roughness, a pigment, skin sensitivity, a skin tone, and sebum of skin of the user, and a device or a system for obtaining a high quality image by further including an infrared filter for removing infrared rays in an infrared wavelength band, in which structures of a sensor, a light source, and a lower case are designed to allow general light and infrared rays emitted from the light source to be emitted to the skin or hair of the user well and allow light reflected and diffracted from the skin or hair of the user to be collected well, and that recommends customized cosmetics, like those of the present invention, are not disclosed at all.

RELATED ART DOCUMENT

Patent Document (Patent Document 1) Korean Patent Laid-Open Application No. 10-2018-0050882 (published on May 16, 2018 and entitled "Skin care device")
(Patent Document 2) Korean Patent Registration No. 10-1756900 (registered on Jul. 5, 2017 and entitled "System for skin care")

DISCLOSURE

Technical Problem

The present invention is directed to providing a system for measuring and analyzing skin and hair, which is capable of measuring a density and a thickness of hair of a user, and elasticity, moisture, wrinkles, pores, oiliness, roughness, a pigment, skin sensitivity, a skin tone, and sebum of skin of the user and obtaining a high quality image by further including an infrared filter for removing infrared rays in an infrared wavelength band, in which structures of a sensor, a light source, and a lower case are designed to allow general light and infrared rays emitted from the light source to be emitted to the skin or hair of the user well and allow light reflected and diffracted from the skin or hair of the user to be collected well, and which recommends cosmetics according to a characteristic of the skin of the user.

Technical Solution

One aspect of the present invention provides a system for measuring and analyzing skin and hair, which includes a skin and hair measurement and analysis device, a smart terminal of a user in which an application interlinked with the skin and hair measurement and analysis device is installed, and a server interlinked with the skin and hair measurement and analysis device and interlinked with the smart terminal, wherein the skin and hair measurement and analysis device includes: a light source including a first light source configured to emit general light and a second light source configured to emit ultraviolet rays of a 375 nm band, a lens supported by a lens guide bracket and configured to collect light emitted from the light source and reflected and diffracted from skin and hair of the user, a sensor configured to acquire an image from the light that enters through the lens, a polarizing film including a first polarizing film in a horizontal direction, which is located in a portion of a front surface of the first light source in an emission direction and through which a portion of the general light passes, and a second polarizing film located on a front surface of the lens and configured to polarize light in a direction perpendicular to the horizontal direction of the first polarizing film, a main printed circuit board (PCB) which controls each component of the skin and hair measurement and analysis device and on which the sensor is mounted, a battery configured to supply electric power to each component of the skin and hair measurement and analysis device, a communication part configured to communicate with an external device through a chip mounted on the main PCB, an input/output part configured to turn the skin and hair measurement and analysis device on or off and configured to receive a manipulation of the user or output an instruction or provide information to the user; and a case which includes a lower case configured to support the light source, the lens, and the polarizing film and applied to the skin or hair of the user, an upper case configured to support the battery, and a middle case located between the lower case and the upper case and configured to support the main PCB and which constitutes an entire outer frame of the skin and hair measurement and analysis device through assembly of the lower case, the upper case, and the middle case.

The smart terminal may process a hair image obtained from the sensor according to a manipulation of the input/output part by the user or a touch manipulation in an application to measure and analyze a density and a thickness of the hair of the user, process the hair image, and count only the number of pores, which are starting points of hairs present on a unit screen, to automatically display one hair in the application when the density of the hair is measured and analyzed, receive an input of a touch of the user with respect to a portion displayed as one hair to correct the number of hairs when the number of hairs coming out of the pores is more than one, and calculate a thickness of the hair by processing the hair image and using a vertical distance between both sides of the hair on scalp when the input of the touch of the user for selecting the hair from the hair image is received.

The system may further include an ultrasonic element provided on one side of the lower case and configured to apply ultrasonic waves to the skin of the user, and a vibration measuring part provided on the other side of the lower case to measure a vibration of the skin, wherein elasticity of the skin of the user may be measured and analyzed on the basis of a result obtained through frequency conversion of a detected value of the vibration measuring part.

The system may further include a current application pattern provided on one side of the lower case in the form of a PCB to be in contact with the skin of the user, and a dielectric applied on the current application pattern, wherein moisture of the skin of the user may be measured and analyzed on the basis of a charge amount charged to the current application pattern.

The sensor may analyze an image in a first image mode on the basis of an image acquired through general light not passing through the first polarizing film to measure wrinkles, pores, oiliness, and roughness of the skin of the user, the sensor may analyze an image in a second image mode on the basis of the image acquired through the general light passing through the first polarizing film to measure a pigment of the skin, skin sensitivity, and a skin tone of the user, and the sensor may analyze an image in a third image mode on the basis of an image acquired through ultraviolet rays to measure sebum of the skin of the user.

In the measurement of the wrinkles, a wrinkle region may be extracted by filtering the image in the first image mode, the number of pixels in the wrinkle region may be counted to measure an area of the wrinkle, and thus a depth of the wrinkle may be measured on the basis of the darkest pixel value in the wrinkle region.

In the measurement of the pores, a pore region may be extracted by filtering the image in the first image mode, the number of pixels in the pore region may be counted to measure an area of the pore, and thus a depth of the pore may be measured on the basis of the darkest pixel value in the pore region.

In the measurement of the pigment of the skin including freckles and moles the user, a pigmentation region may be extracted by filtering the image in the second image mode, an area of the pigmentation region may be measured by counting the number of pixels in the pigmentation region, and an average of gray scale values of the pigmentation region may be calculated so that a degree of darkening of the pigmentation region may be measured.

In the measurement of the skin tone of the user, average red/green/blue (RGB) values may be calculated using the image in the second image mode to measure a skin color of the user, and the skin tone of the user may be measured by discriminating a cool tone on the basis of an average value of blue among the average RGB values from a warm tone on the basis of an average value of yellow among the average RGB values.

The system may further include an infrared filter provided between the lens and the sensor and configured to remove infrared rays in an infrared wavelength band to obtain high image quality, and the infrared filter may include a plate configured to doubly refract light.

A central axis of the sensor, a central axis of the lens, and a central axis of the case may coincide with each other, and in order for normal light and ultraviolet rays emitted from the light source to be emitted to the skin or hair of the user well, and in order for the reflected and diffracted light from the skin or hair of the user to be collected well, a first hollow may be formed in a portion of the lower case including the central axis thereof, a second hollow may be formed in a portion of the light source including the central axis thereof, the first light source and the second light source may each be provided with a plurality of light sources along a circumference, since a radius (R21) of a circle where the first light source is formed is different from a radius (R22) of circle where the second light source is formed, the radii may be designed to not physically overlap each other, and the radius (R21) of the circle where the first light source is formed and the radius (R22) of the circle where the second light source is formed may be designed to be smaller than a radius (R1) of the first hollow and designed to satisfy R21<R22<R1 or R21+2a=R22+a=R1 (here, a is a number that is greater than zero and is a predetermined separation distance).

Customer information of the user, information on survey questions, image information of the user, and environmental information may be synthesized, the skin of the user may be diagnosed, beneficial and harmful ingredients for the user may be suggested, and cosmetics may be recommended to the user on the basis of amounts of the beneficial and harmful ingredients in a cosmetics database.

A lens module including the light source, the polarizing film, and the lens may be physically and electrically connected to the main PCB through a plurality of connection pins, and in the lens module for skin inspection, scalp inspection, and hair inspection, when connection pins of a predetermined combination among the plurality of connection pins are electrically connected, a type of a corresponding lens module may be recognized as the lens module for skin inspection, scalp inspection, or hair inspection, or a type of the lens module may be recognized by measuring a resistance value allocated or preset for each lens module for skin inspection, scalp inspection, and hair inspection through supply of a current to the connection pin.

Advantageous Effects

A system for measuring and analyzing skin and hair has the following effects.

First, it is possible to easily and accurately measure and analyze a density and a thickness of hair of a user.

Second, it is possible to accurately measure elasticity, moisture, wrinkles, pores, oiliness, roughness, pigment, skin sensitivity, skin tone, and sebum of the skin of the user.

Third, an infrared filter configured to remove infrared rays in an infrared wavelength band is further included so that high image quality can be obtained.

Fourth, in order for normal light and ultraviolet rays emitted from the light source to be emitted to the skin or hair of the user well, and in order for the reflected and diffracted light from the skin or hair of the user to be collected well, structures of a sensor, a light source, and a lower case are designed.

Fifth, customer information of the user, information on survey questions, image information of the user, and environmental information can be synthesized, the skin of the user can be diagnosed, beneficial and harmful ingredients for the user can be suggested, and cosmetics can be recommended to the user on the basis of amounts of the beneficial and harmful ingredients in a cosmetics database.

Sixth, when connection pins of a predetermined combination among the plurality of connection pins are electrically connected, a type of a corresponding lens module can be recognized as the lens module for skin inspection, scalp inspection, and hair inspection, or a type of the lens module can be recognized by measuring a resistance value allocated or preset for each lens module for skin inspection, scalp inspection, and hair inspection through supply of a current to the connection pins.

MODES OF THE INVENTION

Hereinafter, exemplary embodiments according to the present invention will be described in detail with reference to the accompanying drawings. Before describing the present invention, it should be understood that terms or words used herein and in the appended claims should not be construed to be limited to ordinary or dictionary meanings, but should rather be construed in accordance with meanings and concepts consistent with the technical spirit of the present invention according to the principle that inventors can properly define concepts of terms in order to describe their inventions in the best manner.

Therefore, the embodiments described herein and the configurations shown in the drawings are merely the most exemplary embodiments of the present invention and do not represent the entire technical spirit of the present invention, and therefore it should be understood that, at the time of filing of the present application, there may be various equivalents and modifications with which the embodiments and the configurations can be substituted.

Configuration of System for Measuring and Analyzing Skin and Hair

Figure 1:
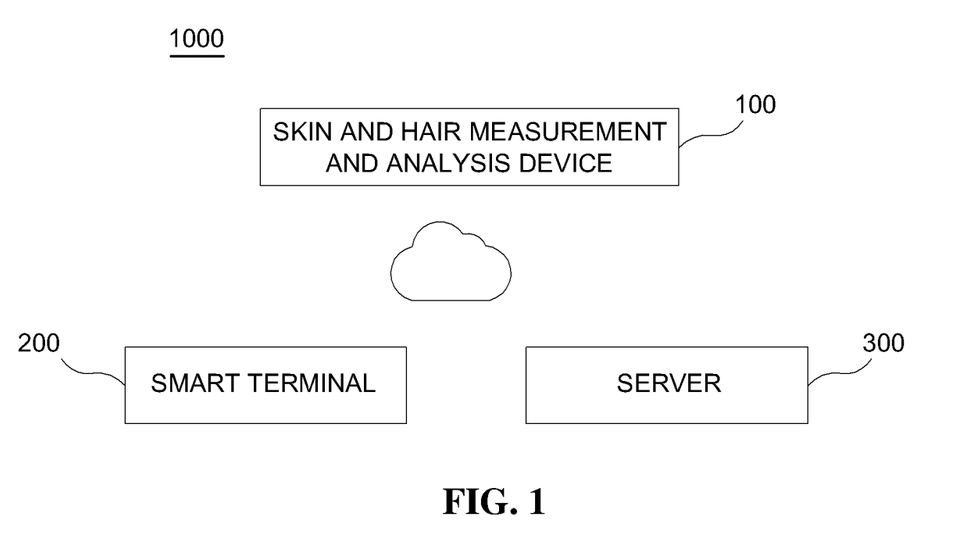
FIG. 1 is a schematic block diagram illustrating a configuration of a system for measuring and analyzing skin and hair according to an exemplary embodiment of the present invention.
Figure 2:
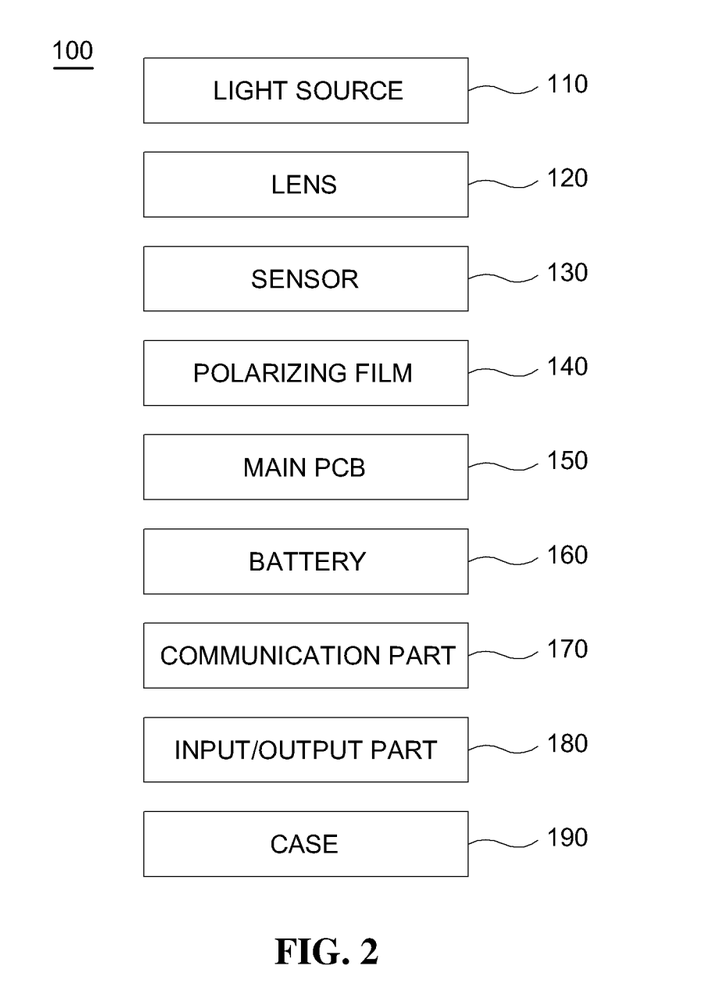
FIG. 2 is a schematic block diagram illustrating a configuration of a skin and hair measurement and analysis device according to an exemplary embodiment of the present invention.
Figure 3:
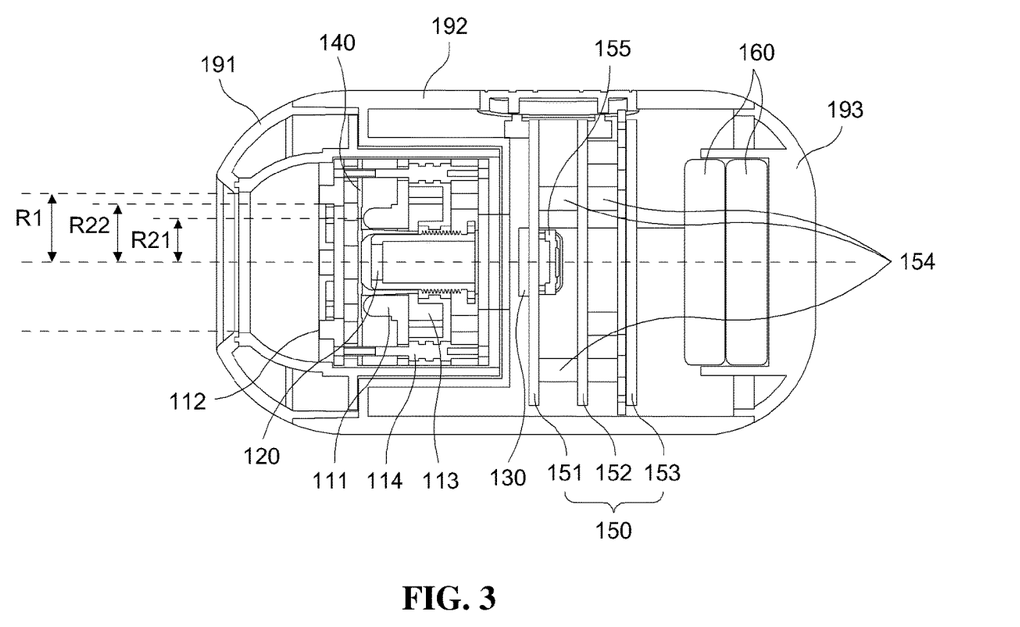
FIG. 3 is a cross-sectional view illustrating the configuration of the system for measuring and analyzing skin and hair according to an exemplary embodiment of the present invention.
Figure 4:
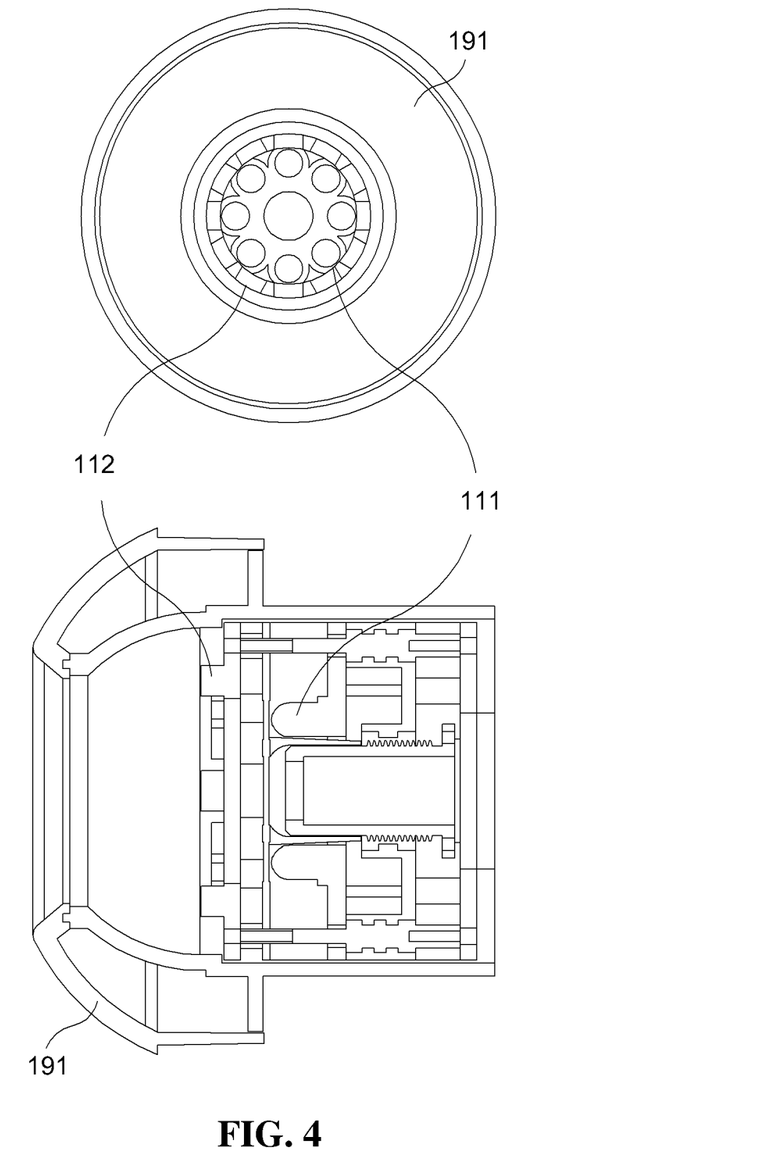
FIG. 4 shows a front view and an enlarged view illustrating a lower case of the system for measuring and analyzing skin and hair according to an exemplary embodiment of the present invention.
Figure 5:
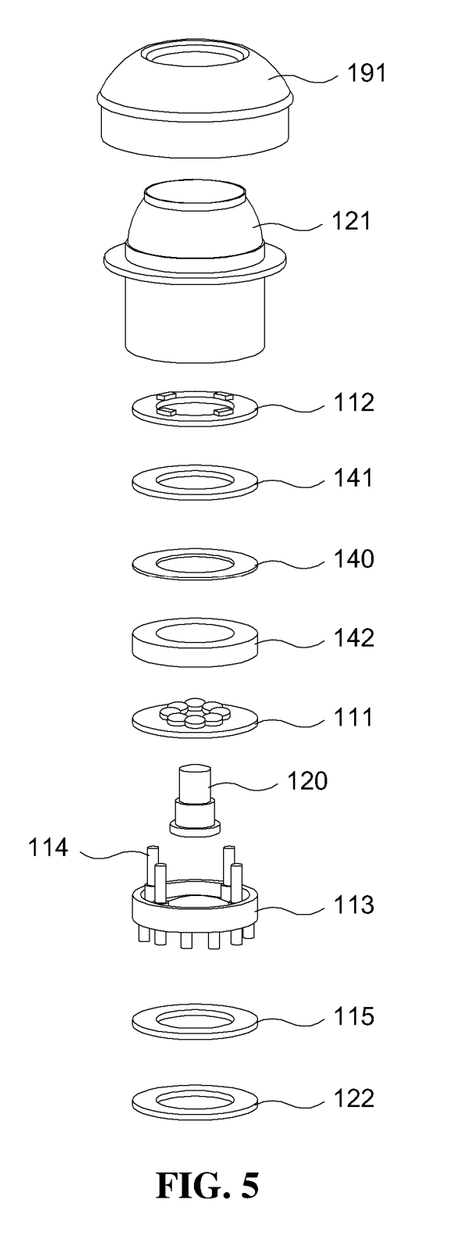
FIG. 5 is an exploded perspective view illustrating the system for measuring and analyzing skin and hair according to an exemplary embodiment of the present invention.

FIG. 1 is a schematic block diagram illustrating a configuration of a system for measuring and analyzing skin and hair according to an exemplary embodiment of the present invention, FIG. 2 is a schematic block diagram illustrating a configuration of a skin and hair measurement and analysis device according to an exemplary embodiment of the present invention, FIG. 3 is a cross-sectional view illustrating the configuration of the system for measuring and analyzing skin and hair according to an exemplary embodiment of the present invention, FIG. 4 shows a front view and an enlarged view illustrating a lower case of the system for measuring and analyzing skin and hair according to an exemplary embodiment of the present invention, and FIG. 5 is an exploded perspective view illustrating the system for measuring and analyzing skin and hair according to an exemplary embodiment of the present invention.

As shown in the drawings, a system for measuring and analyzing skin and hair 1000 according to the present invention includes a skin and hair measurement and analysis device 100, a smart terminal 200, and a server 300.

Here, the smart terminal 200 may be a general smart phone possessed by a user, a dedicated terminal manufactured for measuring and analyzing skin and hair, or a home computer terminal such as a desktop or laptop and an application which is interlinked with the skin and hair measurement and analysis device 100 for measuring and analyzing skin and hair may be installed on the smart terminal 200 through Play Store or App Store. Alternatively, the smart terminal 200 may be connected to a website through wired/wireless communication to be interlinked with the skin and hair measurement and analysis device 100.

In addition, the server 300 is a component interlinked with the skin and hair measurement and analysis device 100 and the smart terminal 200, allows the user to be connected to a website or to be remotely connected to the skin and hair measurement and analysis device 100 through the application, and is capable of providing recommended cosmetics to the user by storing and analyzing personal information of the user and skin and hair measurement data.

Naturally, when the storage of information for recommendation or the execution of a recommendation algorithm requires much processing, the storage and the execution may be performed by the server instead of the terminal. In addition, by utilizing accumulated information of other users, it is possible to analyze a position of the user or predict a skin condition of the user. The server 300 may be a central server, or alternatively, may be implemented in the form of a cloud server.

The server 300 stores user information, that is, customer information (age, sex, residence, allergy characteristics, and a skin type that the user thinks or knows). In some cases, for example, the server 300 stores information on survey questions, which may be asked at the time of user registration or at a specific period, survey results, image information on hair and skin including the scalp, image acquisition time information, and environmental information such as weather information. It is possible to predict a skin condition of the user using artificial intelligence on the basis of the above information.

Here, by synthesizing the customer information, the information on the survey questions, the image information, and the environmental information, the skin of the user may be diagnosed and beneficial and harmful ingredients may be suggested, or a product (cosmetics and the like) may be recommended in consideration of amounts of the beneficial and harmful ingredients in a cosmetics database in which amounts of ingredients, manufacturers, and model names are already stored or are updated periodically or in real time.

For example, when the user has an allergy, only cosmetics not containing the corresponding allergen, that is, a harmful ingredient, may be recommended, and when the user has xerosis, several cosmetics (for example, three cosmetics) with the highest amount of beneficial ingredients may be recommended on the basis of the amount of beneficial ingredients generally known to relieve xerosis, and when an ultraviolet (UV) index is high on the current day, a predetermined number of cosmetics with high UV protection effect may be recommend. In addition, it is possible to provide guidance on or recommend a cosmetic management method or a customized cosmetic manufacturing method.

In this case, while three cosmetics are recommended, price information or information on cosmetics manufacturers may also be provided to increase user convenience. In addition, by allowing connection to cosmetic sales sites, it is possible to obtain advertising revenue from the cosmetic sales sites, the cosmetics manufacturers, or sales companies.

In some cases, it is possible to match the user with a suitable expert by synthesizing the customer information, the information on the survey questions, the image information, and the environmental information. The server 300 may store information on experts in advance or may update the information periodically or in real time. The expert may be a cosmetics expert or an esthetician, or alternatively, may be a dermatologist.

In addition, the skin and hair measurement and analysis device 100 includes a light source 110, a lens 120, a sensor 130, a polarizing film 140, a main printed circuit board (PCB) 150, a battery 160, a communication part 170, an input/output part 180, and a case 190.

Here, the light source 110 includes a first light source 111 for emitting general light (white light) and a second light source 112 for emitting ultraviolet rays in a 375 nm band. The second light source 112 emits light with maximum energy at a wavelength of 375 nm and is a light source for emitting light of a wavelength having a spectrum of a minimum of 370 nm and a maximum of 380 nm in an ultraviolet band.

Here, a plurality of connection pins 114 protruding from a lens guide bracket 113 in the drawing are components for physically and electrically connecting a chip light-emitting diode (LED) PCB in which the second light source 112 is located and a deep LED PCB in which the first light source 111 is located. It is obvious that the deep LED used as the first light source 111 for emitting general light may be changed to the chip LED, and the chip LED may be changed to the deep LED.

In addition, the lens 120 is supported by the lens guide bracket 113 and is a component for collecting light emitted from the above-described light source 110 and reflected and diffracted from skin and hair of the user. The sensor 130 is located behind the lens 120 and is a component for acquiring an image through light that enters through the lens 120. In addition, a pair of lens housings 121 and 122 for supporting a lens module 120 which is the lens are included.

In addition, the polarizing film 140 includes a first polarizing film in a horizontal direction, which is located on a portion of a front surface of the first light source 111 in an emission direction and through which a portion of the general light passes, and a second polarizing film positioned on a front surface of the lens 120 and configured to polarize light in a direction perpendicular to the horizontal direction of the first polarizing film. The polarizing film 140 is supported by upper and lower polarizing film brackets 141 and 142.

In addition, the main PCB 150 is a component which controls each component of the skin and hair measurement and analysis device 100 and on which the sensor 130 is mounted. As shown in FIG. 3, the main PCB 150 is implemented as multiple layers, for example, three PCB layers 151, 152, and 153, and pillars 154 serve to physically connect the PCB layers, and simultaneously serve to electrically connect the PCB layers. A type-C USB port 155 is provided in the main PCB 150 and may be used for charging the battery 160 and installing or updating internal software of the skin and hair measurement and analysis device 100.

The above-described lens module including a light source 110, a polarizing film 140, and the lens 130 may be formed in various types according to the use. That is, there are several types of the lens module according to the use for skin, scalp, and hair inspection, and the lens module has a function of automatically recognizing the use. The main PCB 150, the lens 130, the light source 110, and the polarization film 140 are physically or electrically connected by a plurality of connection pins that pass therethrough. When connection pins of a predetermined combination among the plurality of connection pins are electrically connected, a type of a corresponding lens module may be recognized as the lens module for skin, scalp, or hair inspection.

For example, the main PCB unit 150 and the lens module are physically and electrically connected using six connection pins when viewed from the outside. In the case of the lens module for skin inspection, the main PCB unit 150 and the lens module are electrically connected with a combination of second, fourth, and sixth connection pins to form a circuit and supply electric power. In the case of the lens module for scalp inspection, the main PCB unit 150 and the lens module are electrically connected with a combination of first, second, and third connection pins to form a circuit and supply electric power. In case of the lens module for hair inspection, the main PCB unit 150 and the lens module are electrically connected with a combination of first, third, and fifth connection pins to form a circuit and supply electric power. The connection pins not used for the electrical connection may have a characteristic of a non-electrical connection. Therefore, when an electrical connection is attempted using the connection pin not used for the electrical connection, resistance becomes infinite so that the main PCB 150 may recognize a type of the lens module.

Alternatively, a current may be supplied to the connection pin to assign the lens module for skin inspection, scalp inspection, or hair inspection, or a preset resistance value may be measured to recognize the type of the lens module. For example, it may be set in advance that, in the case of the lens module for skin inspection, a resistance value of 5 ohms is measured from a circuit which is set through a connection of the connection pin, and in the case of the lens module for scalp inspection, a resistance value of 3 ohms is measured from the circuit which is set through the connection of the connection pin, and in the case of the lens module for hair inspection, a resistance value of 1 ohm is measured from the circuit which is set through the connection of the connection pin. It is possible to recognize the type of the lens module by detecting the resistance values.

Furthermore, by simultaneously using the combination of the plurality of above-described connection pins and the detection of the resistance value in the circuit configuration formed by the combination of the plurality of connection pins, it is also possible to recognize or discriminate the type of the lens module.

In addition, as shown in FIG. 3, the battery 160 is a component disposed in an upper case 193 and configured to supply electric power to each component of the skin and hair measurement and analysis device 100 and may be implemented as a secondary battery. The battery 160 may be charged using an external power supply.

In addition, the communication part 170 is a component configured to communicate with an external device through a chip mounted on the main PCB 150, uses a chip capable of performing communication in a Wi-Fi or Bluetooth standard by being mounted on the main PCB 150, and is capable of transmitting an image acquired from the sensor 130 to the smart terminal 200 of the outside, and thus the smart terminal 200 may perform various forms of measurement, analysis, and prediction. In addition, an image transmitted from the smart terminal 200 may be variously measured, analyzed, and predicted in the server 300.

In addition, the input/output part 180 is a component configured to turn on/off the skin and hair measurement and analysis device 100 and configured to receive an input of a user manipulation or output an instruction or provide information to the user. For example, the input/output part 180 may be implemented as two buttons. It is possible to turn the skin and hair measurement and analysis device 100 on or off by long-pressing one button. When images of skin, scalp, and hair are captured, a manipulation may be input by briefly pressing one of the two buttons provided in the input/output part 180. Although the two buttons are provided, it is possible to implement various inputs (a focusing button for image capture in addition to a power button and an image capture button) through a combination of the two buttons.

In addition, the case 190 includes a lower case 191 configured to support the light source 110, the lens 120, and the polarizing film 140 and applied to skin or hair of the user, the upper case 193 configured to support the battery 160, and a middle case 192 located between the lower case 191 and the upper case 193 and configured to support the main PCB 150. The lower case 191, the middle case 192, and the upper case 193 are assembled with each other to constitute an entire outer frame of the skin and hair measurement and analysis device 100.

Here, a central axis of the sensor 130, a central axis of the lens 120, and a central axis of the case 110 coincide with each other. In order for normal light and ultraviolet rays emitted from the light source 110 to be emitted to the skin or hair of the user well, and in order for the reflected and diffracted light from the skin or hair of the user to be collected well, a first hollow is formed in a portion of the lower case 191 including the central axis thereof, and a second hollow is formed in a portion of the light source 110 including the central axis thereof.

A plurality of first light sources 111 and a plurality of second light sources 112 are formed along a circumference. Since a radius R21 of a circle where the first light sources 111 are formed is different from a radius R22 of a circle where the second light sources 112 are formed, the radii R21 and R22 may be designed to not physically overlap each other, and the radius R21 of the circle where the first light sources 111 are formed and the radius R22 of the circle where the second light sources are formed may be designed to be smaller than a radius R1 of the first hollow. That is, the first light sources 111 and the second light sources 112 may be designed to satisfy R21<R22<R1 or R21+2a=R22+a=R1. Here, a is a number that is greater than zero and is set to a predetermined separation distance.

Meanwhile, in order to obtain a high quality image, an infrared filter (not shown) configured to remove infrared rays in an infrared wavelength band is further included between the lens 120 and the sensor 130. The infrared filter may include a plate configured to doubly refract light.

Density and Thickness of Hair

The smart terminal 200 may process a hair image obtained from the sensor 130 according to a manipulation of the input/output part by the user or a touch manipulation in the application of the smart terminal 200 to measure and analyze a density and a thickness of hair of the user.

Here, when the density of hair is measured and analyzed, the hair image is processed and only the number of pores, which are starting points of the hair (points where the hair comes out of the scalp) on a unit screen, is counted and automatically displayed as one hair in the application. Even when the number of hairs coming out of the pores is greater than one, it is possible to manually receive an input of a touch of the user for a portion which is incorrectly displayed as "one hair" to automatically correct the number of hairs.

In addition, when a thickness of the hair is determined according to a touch manipulation of the user or is automatically determined in the application, the hair image is enlarged, and when a hair selection is input by the touch of the user, the hair image is processed using, for example, a gray scale, points where a sudden change of the gray scale occurs in the hair image (that is, a boundary between the hair and the scalp) are connected, and both sides of the hair are extracted. When a vertical distance between the both sides of the hair on the scalp is calculated, it is possible to measure the thickness of the hair.

Measurement and Analysis of Skin Index

For measuring elasticity of the skin of the user, an ultrasonic element (not shown) provided on one side of the lower case 191 and configured to apply ultrasonic waves to the skin of the use may be further included. In addition, a vibration measuring part (not shown) provided on the other side of the lower case 191 and configured to measure a vibration of the skin may be further included. The elasticity of the skin of the user is measured and analyzed on the basis of a result obtained through frequency conversion of a detected value of the vibration measuring part (not shown). The better the elasticity of the skin, the better it transmits vibration. The elasticity of the skin is measured on the basis of whether the vibration is transmitted well using the result through the frequency conversion.

In addition, in order to measure moisture of the skin, a current application pattern provided on one side of the lower case 191 in the form of a PCB to be in contact with the skin of the user, and a dielectric applied on the current application pattern may be further included. The moisture of the skin of the user may be measured and analyzed on the basis of a charge amount charged to the current application pattern. As a moisture content of the skin increases, the charge amount is larger, and thus a larger potential difference occurs between the electrodes of the current application pattern.

In addition, the sensor 130 analyzes an image in a first image mode on the basis of an image acquired through general light not passing through the first polarizing film 141 to measure wrinkles, pores, oiliness, and roughness of the skin of the user.

Here, in the measurement of the wrinkles, a wrinkle region is extracted by filtering the image in the first image mode, the number of pixels in the wrinkle region is counted to measure an area of the wrinkle, and thus a depth of the wrinkle may be measured on the basis of the darkest pixel value in the wrinkle region. It is also possible to calculate a wrinkle value by combining the area and the depth of the wrinkle. Assuming that the area of the wrinkle is S1 and the depth of the wrinkle is d1, the wrinkle value may be defined as, for example, S1d1/3.

In addition, in the measurement of the pores, a pore region is extracted by filtering the image in the first image mode, the number of pixels in the pore region is counted to measure an area of the pore, and thus a depth of the pore may be measured on the basis of the darkest pixel value in the pore region. It is also possible to calculate a pore value by combining the area and the depth of the pore. Assuming that the area of the pore is S2 and the depth of the pore is d2, the pore value may be defined as, for example, S2d2.

Meanwhile, the sensor 130 analyzes an image in a second image mode on the basis of an image acquired through general light passing through the first polarizing film to measure a pigment of skin, skin sensitivity, and a skin tone of the user.

Here, in the measurement of the pigment of skin including freckles and moles of the user, a pigmentation region is extracted by filtering the image in the second image mode, an area of the pigmentation region is measured by counting the number of pixels in the pigmentation region, and an average of gray scale values of the pigmentation region is calculated so that a degree of darkening of the pigmentation region may be measured.

In addition, in the measurement of the skin tone of the user, average red/green/blue (RGB) values may be calculated using the image in the second image mode to measure a skin color of the user. By discriminating a cool tone on the basis of an average value of blue among the average RGB values from a warm tone on the basis of an average value of yellow among the average RGB values, the skin tone of the user may be measured.

In addition, the sensor 130 analyzes an image in a third image mode on the basis of an image acquired through ultraviolet rays to measure sebum of the skin of the user.

Although the present invention has been described above with reference to limited embodiments and drawings, the present invention is not limited thereto, and various modifications and variations are possible within the scope of the technical spirit of the present invention and the appended claims to be described below for those skilled in the art to which the present invention pertains.

The invention claimed is:

1. A system for measuring and analyzing skin and hair, the system comprising:
   a skin and hair measurement and analysis device;
   a smart terminal of a user in which an application interlinked with the skin and hair measurement and analysis device is installed; and
   a server interlinked with the skin and hair measurement and analysis device and interlinked with the smart terminal, wherein the skin and hair measurement and analysis device includes:
   a lens module including:
      a light source including at least one first light source configured to emit first light and at least one second light source configured to emit ultraviolet rays of a 375 nm band,
      a lens supported by a lens guide bracket and configured to collect light emitted from the light source and reflected and diffracted from skin and hair of the user, and
      a polarizing film including a first polarizing film in a horizontal direction, which is located in a portion of a front surface of the at least one first light source in an emission direction and through which a portion of the first light passes, and a second polarizing film located on a front surface of the lens and configured to polarize light in a direction perpendicular to the horizontal direction of the first polarizing film;
   a sensor configured to acquire an image from the light that enters through the lens;
   a main printed circuit board (PCB) which controls each component of the skin and hair measurement and analysis device and on which the sensor is mounted;
   a battery configured to supply electric power to each component of the skin and hair measurement and analysis device;
   a wireless communication circuit configured to communicate with an external device through a chip mounted on the main PCB;
   an input/output device including at least one button configured to turn the skin and hair measurement and analysis device on or off, the input/output device configured to receive an input of a manipulation of the user and output an instruction or provide information to the user; and
   a case which includes a lower case configured to support the light source, the lens, and the polarizing film and applied to the skin or hair of the user, an upper case configured to support the battery, and a middle case located between the lower case and the upper case and configured to support the main PCB and which constitutes an entire outer frame of the skin and hair measurement and analysis device through assembly of the lower case, the upper case, and the middle case.

2. The system of claim 1, wherein the smart terminal:
   processes a hair image obtained from the sensor according to the manipulation of the input/output device by the user or a touch manipulation in the application to measure and analyze a density and a thickness of the hair of the user;
   when the density of the hair is measured and analyzed, processes the hair image, and counts only a number of pores, which are starting points of hairs present on a unit screen, to automatically display one hair in the application;
   when a number of hairs coming out of the pores is more than one, receives an input of a touch of the user with respect to a portion displayed as one hair to correct the number of hairs; and
   when the input of the touch of the user for selecting the hair from the hair image is received, calculates a thickness of the hair by processing the hair image and using a vertical distance between both sides of the hair on scalp.

3. The system of claim 2, further comprising:
an ultrasonic wave transmitter disposed on one side of the lower case and configured to apply ultrasonic waves to the skin of the user; and
a vibration measuring vibrometer disposed on another side of the lower case and configured to measure a vibration of the skin,
wherein elasticity of the skin of the user is measured and analyzed based on a result obtained through frequency conversion of a detected value of the vibration measuring vibrometer.

4. The system of claim 3, further comprising:
a current application pattern provided on the one side of the lower case in a form of the PCB to be in contact with the skin of the user; and
a dielectric applied on the current application pattern,
wherein moisture of the skin of the user is measured and analyzed based on the basis of a charge amount charged to the current application pattern.

5. The system of claim 4, wherein:
the sensor analyzes an image in a first image mode based on an image acquired through first light not passing through the first polarizing film to measure wrinkles, pores, oiliness, and roughness of the skin of the user;
the sensor analyzes an image in a second image mode based on the image acquired through the first light passing through the first polarizing film to measure a pigment of the skin, skin sensitivity, and a skin tone of the user; and
the sensor analyzes an image in a third image mode based on an image acquired through ultraviolet rays to measure sebum of the skin of the user.

6. The system of claim 5, wherein, in the measurement of the wrinkles, a wrinkle region is extracted by filtering the image in the first image mode, a number of pixels in the wrinkle region is counted to measure an area of the wrinkle, and thus a depth of the wrinkle is measured based on a darkest pixel value in the wrinkle region.

7. The system of claim 6, wherein, in the measurement of the pores, a pore region is extracted by filtering the image in the first image mode, the number of pixels in the pore region is counted to measure an area of the pore, and thus a depth of the pore is measured based on the darkest pixel value in the pore region.

8. The system of claim 7, wherein, in the measurement of the pigment of the skin including freckles and moles of the user, a pigmentation region is extracted by filtering the image in the second image mode, an area of the pigmentation region is measured by counting a number of pixels in the pigmentation region, and an average of gray scale values of the pigmentation region is calculated so that a degree of darkening of the pigmentation region is measured.

9. The system of claim 8, wherein, in the measurement of the skin tone of the user, average red/green/blue (RGB) values are calculated using the image in the second image mode to measure a skin color of the user, and the skin tone of the user is measured by discriminating a cool tone based on an average value of blue among the average RGB values from a warm tone based on an average value of yellow among the average RGB values.

10. The system of claim 9, further comprising an infrared filter provided between the lens and the sensor and configured to remove infrared rays in an infrared wavelength band to obtain high image quality,
wherein the infrared filter includes a plate configured to doubly refract light.

11. The system of claim 1, wherein:
a central axis of the sensor, a central axis of the lens, and a central axis of the case coincide with each other;
a first hollow is defined in the lower case at a portion including the central axis of the lower case, the first hollow being configured to allow the first light and the ultraviolet rays emitted from the light source to effectively reach the user's skin or hair, and to enable the reflected or diffracted light from the user's skin or hair to be effectively collected;
a second hollow is defined in the light source at a portion including the central axis of the light source;
the at least one first light source includes a plurality of first light sources arranged along a first circumference of a first circle having a first radius;
the at least one second light source includes a plurality of second light sources arranged along a second circumference of a second circle having a second radius;
the first radius and the second radius are different from each other to prevent physical overlap of the plurality of first light sources and the plurality of second light sources; and
the first radius and the second radius are both smaller than the first hollow's radius.

12. The system of claim 1, wherein customer information of the user, information on survey questions, image information of the user, and environmental information are synthesized, the skin of the user is diagnosed, beneficial and harmful ingredients for the user are suggested, and cosmetics are recommended to the user based on amounts of the beneficial and harmful ingredients in a cosmetics database.

13. The system of claim 12, wherein:
the lens module is physically and electrically connected to the main PCB through a plurality of connection pins; and
a type of the lens module is recognized as the lens module for skin inspection, scalp inspection, or hair inspection when connection pins of a predetermined combination among the plurality of connection pins are electrically connected, or by measuring a resistance value predetermined for each of the lens module for the skin inspection, the scalp inspection, and the hair inspection through supplying a current to the plurality of connection pins.

14. The system of claim 1, wherein the first light is a white light.

* * * * *